(No Model.) 2 Sheets—Sheet 2.
J. B. ALTMAN.
PLANTER.

No. 308,545. Patented Nov. 25, 1884.

WITNESSES:
O. M. Kramer
R. W. Bishop

INVENTOR:
John B. Altman
By R. S. & A. P. Lacey
Attys

UNITED STATES PATENT OFFICE.

JOHN B. ALTMAN, OF CASCADE, IOWA.

PLANTER.

SPECIFICATION forming part of Letters Patent No. 308,545, dated November 25, 1884.

Application filed July 12, 1884. (No model.)

*To all whom it may concern:*

Be it known that I, JNO. B. ALTMAN, a citizen of the United States, residing at Cascade, in the county of Dubuque and State of Iowa, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to the class of planting-machines; and its object is to provide means to make the successive plantings at equal distances apart. A further object is to enable the driver to make the shoes or runners penetrate to a greater or less depth in the soil, as desirable.

The invention consists in pivoting or hinging the draft-frame, to which the seed-boxes and the runners or shoes of usual construction are fixed, to the main frame of the machine or the frame to which the axle and seat are attached, the draft-frame being raised or lowered on its pivots or hinges by means of a cross-bar and lugs attached thereto, the lever of which is within reach of the driver, and the construction of which is hereinafter more fully described.

The invention also consists in fixing on the axle of the machine a cam-roller, by means of which and a horizontal pivoted bar actuated by the same the slide bar is reciprocated.

Figure 1:
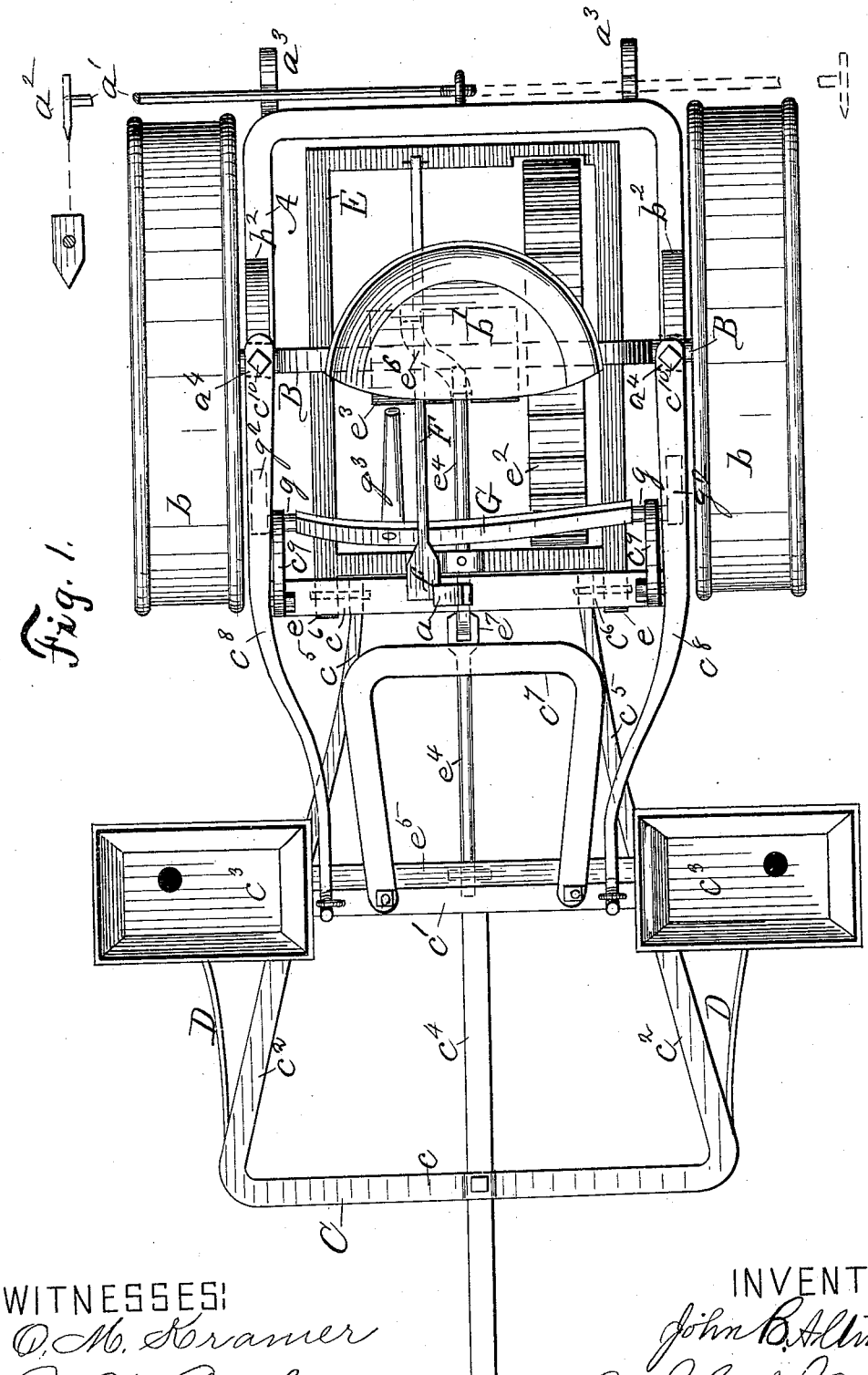
Figure 2:
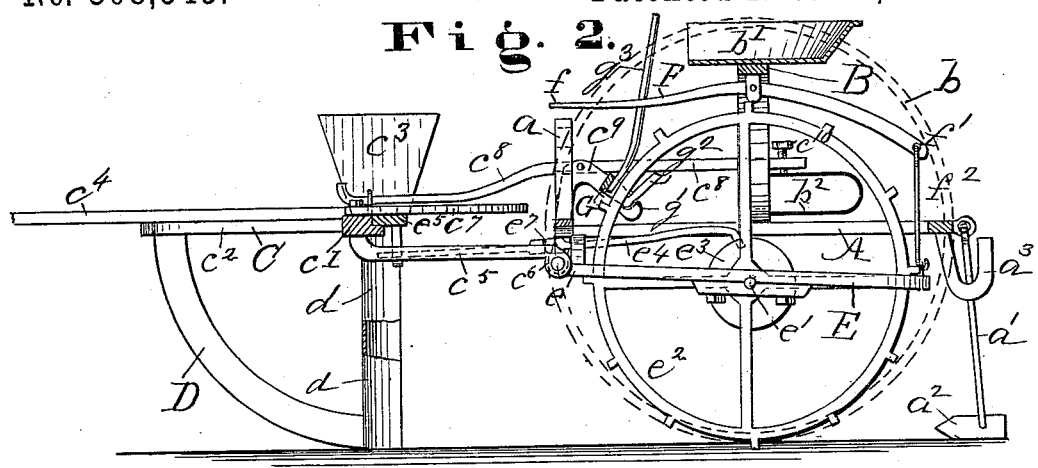
Figure 3:
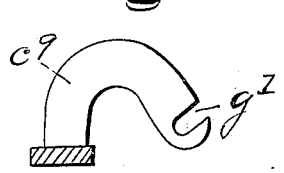
Figure 4:
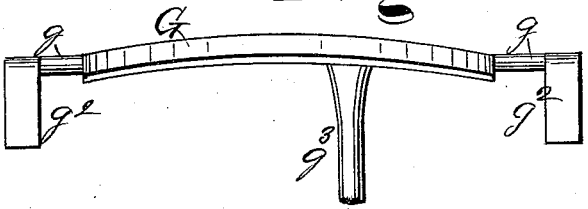
Figure 5:
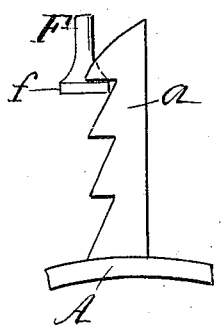
Figure 6:
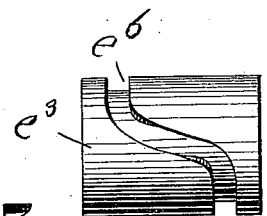
Figure 7:
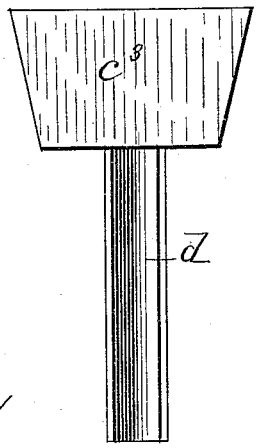

In the drawings accompanying and forming part of this specification, Figure 1 represents a plan of the machine. Fig. 2 is a vertical longitudinal section of the same with the wheel on the outer side in dotted lines. Figs. 3, 4, 5, 6, and 7 are detail views, showing the particular construction and mode of operation of various parts.

In the accompanying drawings, A represents the main frame of the machine of rectangular shape and having fixed centrally to the upper surface of its front beam an upright detent-bar, $a$.

$a'$ is a marker-bar hooked at its inner end to an eye on the outer edge of the rear beam of the frame A, so that it can turn to either side, and having on its outer end the marker $a^2$.

$a^3$ $a^3$ are hooks depending from each rear corner of the main frame to make the marker-bar stand out laterally when turned to either side.

$a^4$ $a^4$ are bearings on the upper surfaces of the side beams of the frame A for the journals of the axle B. The axle carries the wheels $b$ $b$, which turn loosely therein, and is shaped into an upright semicircle, within the side bar S of the main frame on the apex of which semicircle is fixed the seat $b'$.

$b^2$ $b^2$ are leaf-springs fixed to the axle, running thence backward, then upward and forward, and having a purpose hereinafter explained.

C is the draft-frame of the machine, composed of the front beam, $c$, the rear beam, $c'$, and the two similar side beams, $c^2$ $c^2$, running backwardly and inwardly from the former to the latter. The rear beam, $c'$, is somewhat longer than the front beam, and has fixed upon its ends outside of the side beams the similar seed-boxes, $c^3$ $c^3$, of the usual or other proper construction.

$c^4$ is the tongue or pole fixed centrally to the beams $c$ and $c'$, as shown.

$c^5$ $c^5$ are similar bars, having their front ends connected by a transverse bar bolted to the under surface of the beam $c'$, and their rear ends hinged or pivoted to lugs $c^6$ $c^6$, depending from the under surface of the front beam of the main frame.

$c^7$ is a U-shaped horizontal bar bolted by its ends to the upper surface of the beam $c'$, and serving a purpose hereinafter explained, and $c^8$ $c^8$ are similar bars, pivoted near their centers to lugs $c^9$ $c^9$, rising from the front corners of the main frame, having their front ends hooked and engaged in eyes rising from the beam $c'$ outside of the ends of the bar $c^7$, and their rear ends extended backward. The said rear ends have passing through them the adjusting-screws $c^{10}$ $c^{10}$, the lower ends of which bear upon the upper leaves of the springs $b^2$.

D D are the shoes or runners of the usual curved shape, having their front ends fixed to the front corners of the draft-frame C, thence curving downward and backward with their rear ends fixed to the lower ends of the seed tubes or grooves $dd$, the upper ends of which open into the seed-boxes by proper apertures. When the frames A and C are in the same horizontal line, the ends of the bars $c^8$ bear on the springs $b^2$, and when the latter frame is depressed to a certain degree the end of the adjusting-screws $c^{10}$ may be brought to bear on said springs.

E is the frame carrying the driving-wheel, rectangular in shape, smaller in dimensions than and situated centrally within the main frame, to which it is connected by lugs $e\ e$, standing horizontally from its front corners, which pivot on the lugs $c^6\ c^6$ of said main frame. The frame E is provided centrally on its side beams with bearings for the journals of the shaft $e'$, upon which are fixed the driving or actuating wheel $e^2$, similar to a reaper-wheel, and the cam-roller $e^3$, which actuates the pivoted rod or lever $e^4$ that reciprocates the slide-bar $e^5$. The slide-bar is sustained by and moves against the bar $c'$ of the draft-frame, and the cam-groove $e^6$ on the cam-roller is so made as to allow a proper delay after each lateral motion of the slide-bar. The rod or lever $e^4$ is pivoted at a proper point to the front beam of the main frame, is provided with a vertical hinge, $e^7$, between the main frame and draft-frame to accommodate itself to their motion, and has its front end passing through a slot in a depending lug on the slide-bar, so as to allow the latter to move in a right line.

F is a curved bar pivoted centrally to a lug depending from the under surface of the semicircular portion of the axle B. The front end, $f$, of the bar F is flattened laterally, so that its edge can engage the teeth of the detent-bar $a$, and its upper surface may be pressed upon by the foot of the driver. The rear end, $f'$, of the bar F is pivoted or hooked to the link $f^2$, the lower hooked end of which engages on an eye fixed to the upper surface of the rear beam of the frame E. By means of the detent-bar $a$, the bar F, and the link $f^2$, the frame E and its attached driving-wheel and cam-roller may be raised on the main frame at the will of the driver.

G is a transverse rock-bar, having near its ends journals $g\ g$, which fit and turn in open slots or recesses $g'\ g'$, made in the backwardly and downwardly turned ends of the lugs $c^9\ c^9$, on the front corners of the main frame. The bar G has on its ends the lugs $g^2\ g^2$, which may be brought to bear on the under surfaces of the bars $c^8$ by a lever-handle, $g^3$, rising from the upper surface of said bar and within reach of the driver.

The operation of my machine is as follows: The bar F being disengaged from the detent-bar $a$, the rear end of the frame E falls below the level of the main frame, and the driving-wheel $e'$ engages the ground and rotates the shaft $e$ and attached cam-roller $e^2$, which by means of its groove $e^6$ vibrates the rod $e^3$ and reciprocates the slide-bar $e^4$, delivering the grain at proper intervals, as is desired. In this position of parts the draft-frame is on a line with the main frame. The grain-delivering tubes or grooves $d\ d$ are vertical, and the shoes or runners D D penetrate to their least distance in the soil; also, rear ends of the bars $c^8$ bear on the springs $b^2$, and give the said runners an easier and less rigid motion.

When it is desirable to lift the driving-wheel from the ground and stop the planting, (as when turning,) the bar F is engaged on a proper tooth of the detent-bar $a$, thus raising the frame E that carries the drive-wheel.

When it is desired to make the runners penetrate the soil more deeply, the driver pushes the lever-handle $g^3$ forward, rotates the bar G, and by means of the lugs $g^2\ g^2$ lifts the rear ends of the bars $c^8$, and consequently depresses the draft-frame on its pivot-points, and also the attached runners.

In lifting the frame E the driver presses his foot on the ∪-shaped bar $c^7$, bringing the draft-frame and main frame more nearly into line and making the engagement of the bar F on the detent $a$ easier. The marker-bar $a'$ and attached marker is turned to the other side when the machine is turned to plant in the reverse direction.

Having thus described my invention, what I claim, and desire to secure by Letters Patent, is—

1. The combination of the main frame, the spring or yielding supports mounted thereon, the draft-frame hinged to the forward edge of the main frame, and a bar or bars pivoted between its ends on the main frame and having its rear end bearing on the spring-supports and its forward end extended over and bearing upon the draft-frame, substantially as and for the purposes specified.

2. The combination, with the main frame and the spring-supports thereon, of the draft-frame, the bar or bars pivoted between its ends on the main frame, and bearing at its forward end on the draft-frame and extended at its rear end over the spring-supports, and a set-screw turned through the lever and against the spring-support, whereby the tension or pressure on the draft-frame may be regulated, substantially as set forth.

3. The combination, with the main frame, the draft-frame hinged thereto, and spring-supports mounted on the main frame, of lever bar or bars pivoted between its ends on the main frame, and bearing at its forward end on the draft-frame, and a rock bar or shaft journaled on the main frame and provided with a crank, lug, or arm arranged to engage under and elevate the rear arm of said lever-bar, substantially as set forth.

4. The combination of the main frame provided with hooks $a^3\ a^3$, the marking-bar $a'$, provided with marking-shoes $a^2$, the springs $b^2$, mounted on the main frame, the standard-plates $c^9$, supported on the main frame and provided with bearing-notches $g'$, the frame $h$, supporting the dropping-wheel shaft, the draft-frame, the lever-bars $c^8$, pivoted to plates $c^9$, and bearing at their rear ends on springs $b^2$ and at their forward ends on the draft-frames, rock-shaft G, journaled in notches $g'$, and provided with crank-arms $g^2$, bearing under the rear arms of levers $c^8$, and with a handle-lever, $g^3$, and adjusting-screws turned through the rear end of the levers $c^8$, and bearing against springs $b^2$, substantially as and for the purposes specified.

In testimony whereof I affix my signature in presence of two witnesses.

JOHN B. ALTMAN.

Witnesses:
 JACOB LOG,
 JOHN WENDELBERG.